March 22, 1955

V. G. KLEIN ET AL 2,704,678

MEANS FOR COUPLING A LUBRICANT LINE
TO A LUBRICANT-RECEIVING FITTING

Filed Aug. 4, 1951

Victor G. Klein,
Carl H. Mueller,
Inventors.
Koenig and Pope,
Attorneys.

United States Patent Office 2,704,678
Patented Mar. 22, 1955

2,704,678

MEANS FOR COUPLING A LUBRICANT LINE TO A LUBRICANT-RECEIVING FITTING

Victor G. Klein, Defiance, and Carl H. Mueller, St. Louis, Mo., assignors to Lincoln Engineering Company, St. Louis, Mo., a corporation of Missouri Application August 4, 1951, Serial No. 240,383

1 Claim. (Cl. 285—123)

This invention relates to means for coupling a lubricant line to a lubricant-receiving fitting.

The principal object of the invention is the provision of adaptor means particularly for connection of a lubricant line to a lubricant-receiving fitting of the type such as is shown, for example, in U. S. Patent 2,400,817. The invention is particularly useful, by way of example, in installing a central lubrication system on a vehicle, such as an automobile, a truck or a bus, for enabling lubricant delivery lines readily to be connected to existing lubricant-receiving fittings. Ordinarily, such an installation would require the removal of all the existing lubricant-receiving fittings on the vehicle for connection of lubricant delivery lines to the lubrication points. However, in many actual instances, some of the lubricant-receiving fittings cannot be removed, and as to those which can be removed the holes for the fittings vary in size, thus complicating the procedure in connecting lubricant delivery lines thereto. The adaptor means of this invention makes it possible readily to install a central lubrication system without removing any fittings, being readily permanently attached to an existing lubricant-receiving fitting and adapted readily for connection of a lubricant delivery line thereto.

In general, the invention involves an adaptor comprising a male screw member having a longitudinal lubricant passage leading to a socket in one end of the member defined by a relatively thin-walled hollow end portion of the member. A nut is threaded on the screw member over the thin-walled end portion. The nut has an inwardly directed flange adapted upon forcible screwing together of the screw member and the nut to deform the thin-walled end portion radially inwardly. How this adaptor is related and attached to a lubricant-receiving fitting will be made clear in the ensuing specification. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawing, in which one of various possible embodiments of the invention is illustrated, Fig. 1 is a longitudinal section of an adaptor of this invention, illustrating the adaptor as initially applied to a fitting before tightening;

Similar reference characters indicate corresponding parts throughout the several views of the drawing.

Figure 1:
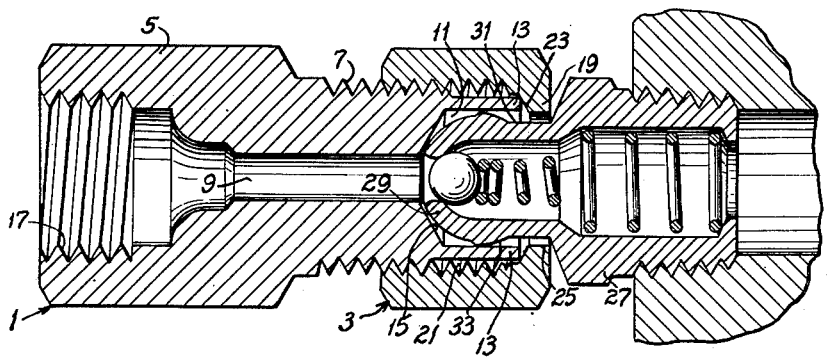
Figure 2:
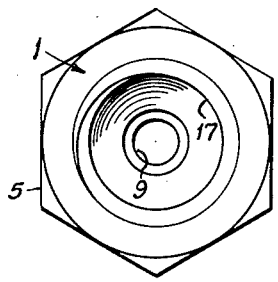
Fig. 2 is a left end view of the adaptor.
Figure 3:
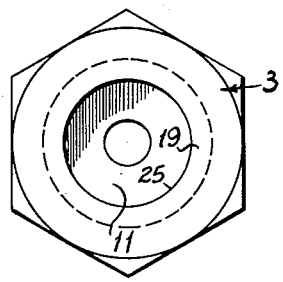
Fig. 3 is a right end view of the adaptor (omitting the fitting)

Referring to the drawing, an adaptor made in accordance with this invention is shown to comprise two parts, a male screw member 1 and a nut 3. As shown, the male screw member has a hexagonal head 5 for application of a tool such as a wrench, and an externally threaded shank 7 extending from the head. A longitudinal lubricant passage 9 extends through the head and shank, leading to an enlarged socket 11 in the outer end of the shank. This socket is defined by a relatively thin-walled hollow end portion 13 of the shank. The end portion 13 is in the form of a thin-walled unthreaded tubular extension at the end of the shank. The external diameter of the extension 13 is less than the minor diameter of the thread on the shank. The inner end or bottom 15 of the socket is of conical form.

The passage 9 may be conveniently formed by boring the screw member 1, and the socket 11 formed by counterboring the end of the shank. The member 1 is also shown as having a threaded counterbore 17 in its head end for reception of a lubricant line connecting screw member (not shown), with a curved transition to the passage or bore 9.

The nut 3 is of hexagonal form for application of a tool such as a wrench. It is threaded on the shank over the thin-walled end portion or extension 13. It has an inwardly directed flange 19 at the outer end of the opening 21 therein. The inside face 23 of this flange is conically convergent in a direction toward the outer end of the nut. As shown, the diameter of the opening 25 defined by the flange 19 corresponds to the internal diameter of the socket 11.

Figure 4:
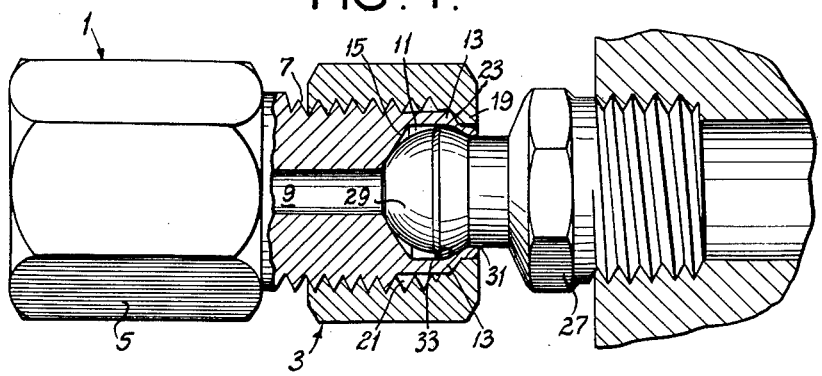
Fig. 4 is a view similar to Fig. 1, illustrating the final condition of the adaptor as tightened and permanently attached to the fitting.

The above-described adaptor is such that it may be readily permanently connected to a lubricant-receiving fitting of the type having an undercut coupler-receiving head, such fittings being well known in the art. It is particularly adapted for connection to a fitting such as is shown in U. S. Patent 2,400,817, and illustrated at 27 in Figs. 1 and 4. Fig. 1 shows the adaptor as initially applied to the fitting before tightening, and Fig. 4 shows the adaptor as it is permanently attached to the fitting.

As related to the adaptor of this invention, the essential feature of the fitting 27 is that it has a head 29 undercut at 31. More particularly, the head is of generally flat truncated hemispherical form having an oppositely presented part-spherical bulge or collar 33 which converges spherically to the undercut portion or neck 31. Other details of the fitting are not essential to this invention, and may be ascertained from the aforesaid U. S. Patent 2,400,817. The internal diameter of the socket 11 and the diameter of the opening 25 in the nut are slightly greater than the diameter of the collar 33 of a particular size of fitting to which the adaptor is to be attached and materially greater than the diameter of the passage 9. The depth of the socket 11 is less than the internal diameter of the socket and somewhat greater than the distance from the flat end of the head 29 to the juncture of the collar 33 and the neck 31.

As shown in Fig. 1, the adaptor is applied to the fitting with the head 29 of the fitting received in the socket 11 through the opening 25 in the nut. Then the member 1 and the nut 5 are forcibly screwed together to draw the nut onto the member 1. As this occurs, the conical inside face of the flange 19 of the nut, acting as a wedge means, deforms the end of the thin-walled end portion or extension 13 of the shank radially inwardly into tight sealing engagement with the collar 33, and the flat end of the head 29 is compressed against the conical bottom 15 of the socket, with the result shown in Fig. 4. This effects a permanent lubricant-tight attachment of the adaptor to the fitting. Then a lubricant line may be readily connected to the member 1 of the adaptor.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

Means for coupling a lubricant line to a lubricant-receiving fitting of the type having a neck and a head on the neck, the head being of generally flat truncated hemispherical form having an oppositely presented part-spherical collar which converges spherically to the neck, comprising a male screw member having a head for application of a tool such as a wrench and an externally threaded shank extending from the head, said member having a longitudinal lubricant passage therethrough leading to an enlarged socket in the outer end of the shank defined by an integral relatively thin-walled unthreaded tubular extension at the outer end of the shank, the external diameter of said extension being less than the minor diameter of the thread on the shank, the depth of the socket being less than the internal diameter of the socket and somewhat greater than the distance from the outer end of the head of the fitting to the collar of the fitting and the internal diameter of the socket being slightly greater than the diameter of the head of the fitting and materially greater than the diameter of said longitudinal lubricant passage, the socket having an outwardly divergent conical bottom where the passage enters the socket, the head of the fitting being received in the socket with its outer end engaging the bottom of the socket, and a nut threaded on the shank over said thin-walled tubular extension having an inwardly directed flange at its outer end bounding an opening having a diameter corresponding to the internal diameter of the socket for reception of the fitting, the inside face of the flange being conically convergent in the direction toward the outer end of the nut and engaging the outer end of said thin-walled tubular extension, and said nut being threaded on the shank for such a distance that the end of the extension is deformed radially inward into tight sealing engagement with said collar and the outer end of the head of the fitting is compressed against the bottom of the socket.

References Cited in the file of this patent

UNITED STATES PATENTS

| | | |
|---|---|---|
| 1,581,838 | Hill | Apr. 20, 1926 |
| 1,672,879 | Campbell | June 12, 1928 |
| 1,883,279 | Zerk | Oct. 18, 1932 |
| 2,545,930 | Richardson | Mar. 20, 1951 |

FOREIGN PATENTS

| | | |
|---|---|---|
| 384,700 | Great Britain | Dec. 15, 1932 |
| 397,670 | Great Britain | Aug. 31, 1933 |